United States Patent [19]

Elder

[11] Patent Number: 4,990,841

[45] Date of Patent: Feb. 5, 1991

[54] MAGNETICALLY GUIDED VEHICLE

[75] Inventor: Mark Elder, Boulder, Colo.

[73] Assignee: Apogee Robotics, Fort Collins, Colo.

[21] Appl. No.: 409,063

[22] Filed: Sep. 19, 1989

[51] Int. Cl.⁵ .............................................. G05D 1/00
[52] U.S. Cl. .............................. 318/587; 364/424.02; 180/168; 180/169; 365/192; 318/580
[58] Field of Search .............. 318/139, 587, 568, 580; 364/424.01, 424.02; 340/825.05; 180/167, 168, 169; 901/1, 7, 14, 46, 47, 50; 358/103

[56] References Cited

U.S. PATENT DOCUMENTS

| | | | |
|---|---|---|---|
| 4,284,160 | 8/1981 | DeLiban et al. | 318/587 X |
| 4,307,329 | 12/1981 | Taylor | 318/587 |
| 4,401,181 | 8/1983 | Schwarz | 180/168 |
| 4,459,590 | 7/1984 | Saulnier | 365/192 |
| 4,472,716 | 9/1984 | Hansen | 180/168 |
| 4,566,032 | 1/1986 | Hirooka et al. | 358/103 |
| 4,613,804 | 9/1986 | Swenson | 180/168 |
| 4,736,812 | 4/1988 | Livneh | 180/168 |
| 4,777,601 | 10/1988 | Boegli | 180/169 |
| 4,780,817 | 10/1988 | Lofgren | 318/587 |
| 4,811,229 | 3/1989 | Wilson | 364/424.02 |
| 4,817,750 | 4/1989 | Ishida et al. | 318/587 |

FOREIGN PATENT DOCUMENTS

| | | | |
|---|---|---|---|
| 0151610 | 9/1983 | Japan | 318/587 |
| 0112312 | 6/1984 | Japan | 318/587 |
| 0209821 | 10/1985 | Japan | 318/587 |

*Primary Examiner*—William M. Shoop, Jr.
*Assistant Examiner*—Paul Ip
*Attorney, Agent, or Firm*—Sherman and Shalloway

[57] ABSTRACT

Disclosed is a computer control device designed to be incorporated in a vehicle such as, for example, a robotic vehicle, which device is designed to be used to guide the vehicle in a desired path. The device includes a multiplicity of Hall effect sensors designed to sense a permanent magnet tape placed on a floor surface and extending along the desired path of motion. A permanent magnet bar code may also be installed on the floor surface and the device includes a reader to read the bar code and transmit read information to the computer, with the computer storing pathway information based upon the bar code. Other aspects are disclosed.

9 Claims, 7 Drawing Sheets

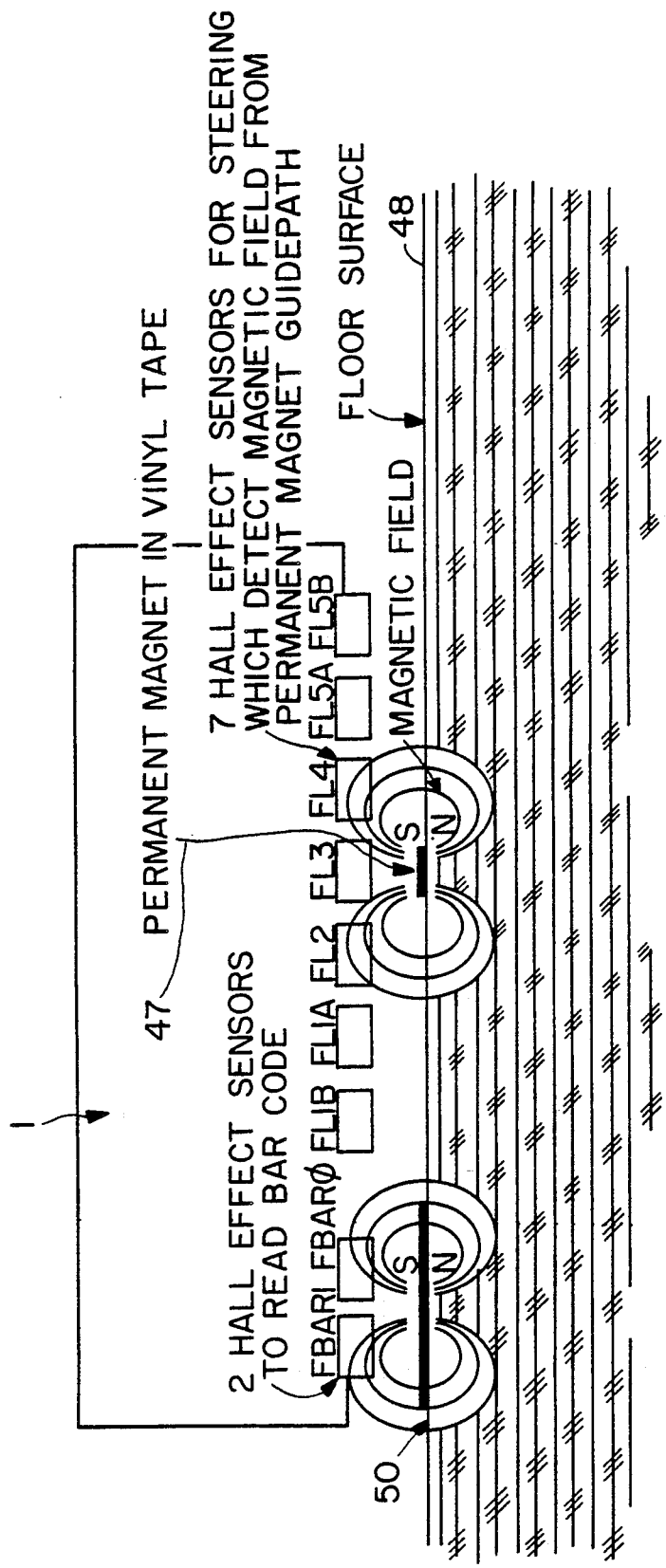

MAGNETICALLY GUIDED VEHICLE

BACKGROUND OF THE INVENTION

The present invention relates to an improved magnetically guided vehicle. In the prior art, devices are known whereby a vehicle or other device is guided through the use of magnetic guidance structure. However, Applicant is unaware of any such device which includes all of the various aspects and nuances of present invention. The following prior art is known to Applicant:

U.S. Pat. No. 2,690,626 to Gay et al. discloses a steering means for toys comprising, essentially, a magnet and steering wheel pivotally mounted so as to follow a track which may consist of a strip of flexible tape containing iron particles. The present invention differs from the teachings of Gay et al. for several reasons including the use of a bar code and bar code reader, as well as the inclusion of sophisticated guidance structure.

U.S. Pat. No. 3,474,877 to Wesener discloses an automatically guided vehicle installation wherein guide means may be a simple band or tape of ferromagnetic material. Additional code markings may be provided for reading by appropriate means on the vehicle to provide specific instructions. The present invention differs from the teachings of this patent as including guidance and sensing structure nowhere taught or suggested by Wesener.

U.S. Pat. No. 3,550,716 to Wickstrom discloses an automobile speed controlling mechanism wherein sensors on a vehicle respond to signals derived by passing through magnetic fields located on a roadway. The system may include strips having a magnetizable print or a preformed polymeric sheet having particles embedded therein.

U.S. Pat. No. 3,575,255 also to Wickstrom discloses further refinements of U.S. Pat. No. 3,550,716. The present invention differs from the teachings of these patents in that the Wickstrom patents are specifically directed to a speed controlling system, whereas the present invention is directed to guidance of a vehicle without the necessity of speed control.

U.S. Pat. No. 3,609,678 to Fayling discloses magnetized means for providing control information to moving vehicles, wherein the means comprises polymer magnets preferably in the form of a sheet or tape and arranged in geometrics or magnetized in patterns to provide specific information. The present invention differs from the teachings of Fayling in that the present invention includes sensing and guidance control means nowhere taught or suggested in Fayling, and further, the Fayling device is intended to be used on a roadway, whereas the present invention is designed to be used on a floor surface.

U.S. Pat. No. 3,653,456 to Uemura discloses a control system for moving vehicles along a predetermined path which may be a strip of magnetic material providing a flux source which may be sensed by structure of the vehicle. The present invention differs from the teachings of Uemura in that Uemura specifically discloses an air-gap head for sensing, which structure is different from the teachings of the present invention.

U.S. Pat. Nos. 3,245,493 to Barrett, Jr., 4,003,445 to De Bruine, 4,593,238 to Yamamoto and 4,593,239 to Yamamoto disclose position location means, either magnetic or optical, as well as separate detection means on a vehicle designed to receive location information from code markers located on one or both sides of a guide path. The present invention differs from the teachings of these patents for the following reasons: with regard to Barrett, Jr., this patent discloses wire guidance which is different from the teachings of the present invention; De Bruine teaches the use of bar codes on the actual path with optical reading means, whereas the present invention discloses magnetic reading means and a magnetized bar code separate from the path and designed to be read by the magnetic bar code reading means to tell the vehicle the configuration of the path; Yamamoto '238 discloses an optical sensor array for stopping a vehicle rather than steering the vehicle; Yamamoto '239 also discloses optical guidance means which is different from the magnetic guidance means of the present invention.

The following U.S. patents include sensing means employed to detect a guide path: 3,669,205 to Brooke (tuned coils responding to a magnetic guide path and wire guidance); 4,714,124 to Laib (Hall effect sensors and wire guidance); 4,566,032 to Hirooka et al. (bar code reading and vision system); 4,777,601 to Boegli (optical sensor).

U.S. Pat. Nos. 3,628,624 to Wesener; 4,015,680 to Pircher et al. and 4,800,978 to Wasa et al. disclose multiple sensors mounted in an array. The sensor arrays as disclosed in these patents provide longitudinal and lateral stability in relation to the guide path by means of sensors in the array being placed in line with and on either side of the guide path such that detection of the path by the outer sensor triggers a steering signal to put the vehicle back on track. Pircher et al., in particular, disclose outer scanning elements positioned at increasing distances from a central element, with the outer elements triggering a greater steering deflection than the inner elements. Concerning these references, Pircher et al. do not disclose a specific preferred guide path material. Wasa et al. disclose the use of an inductive path rather than a permanent magnet path.

U.S. Pat. Nos. 4,345,662 to Deplante and 4,716,530 to Ogawa et al. disclose inclusion in one vehicle system of multiple guide means. Deplante provides an optical guide path and detection means coupled with an ultrasonic emitter-receiver assembly for obstacle detection. Ogawa et al. combine a magnetic guide path comprising a guide wire with optical location markers in particular patterns which provide data instructions for speed and route.

The teachings of these references differ from the teachings of the present invention as will be described in greater detail hereinbelow.

SUMMARY OF THE INVENTION

While the list of references described above is extensive, Applicant believes that the present invention, which includes a combination of elements, is unique and unobvious over the prior art in light of its unique combination of features and modes of operation. The above described prior art describes some of the features of the present invention, however, there is no suggestion or teaching in these references of the specific combination of structures and functions of the present invention. In particular, the present invention is believed unique as including a combination of a linear array of Hall effect sensors designed to be disposed on a vehicle perpendicular to the desired guide path and designed to guide a vehicle over a guide path which is made up of a permanent magnet material. The present invention utilizes passive magnetic Hall effect sensors arranged in a linear array in a new and unique way. The present invention includes the following interrelated aspects and features:

(A) In a first aspect of the present invention, a vehicle is provided which is intended to be controllably moved over a floor surface. A tape incorporating permanent magnet material is installed on the floor surface in a desired path, which path is to be followed by the vehicle.

(B) The vehicle is provided with a guidance system designed to guide the vehicle over the desired path. The guidance system includes a multiplicity of Hall effect sensors disposed on the vehicle in a linear array which is intended to be oriented perpendicular to the longitudinal extent of the path formed by the permanent magnet tape.

(C) Adjacent to the above described multiplicity of Hall effect sensors, two additional Hall effect sensors are provided which are designed to read a magnetic bar code which has been installed on the floor surface in a position adjacent the path. When the vehicle moves over the bar code, these two additional Hall effect sensors may read the bar code and transmit the read information to a controller which also receives inputs from the multiplicity of Hall effect sensors described above.

(D) The controller may consist of a microprocessor controller which receives signals from the various Hall effect sensors via electrical circuitry and, responsive to receipt of such signals, controls movements of the vehicle.

(E) The vehicle includes a plurality of wheels and includes one motor for a left-hand wheel and another motor for a right-hand wheel. The controller, responsive to receipt of sensed data, controls actuation, direction of rotation and speed of the two motors to control speed and direction of the vehicle.

(F) In a unique aspect of the present invention, a ramp-like threshold signal is created and is fed to a multiplicity of comparators equal in number to the number of the multiplicity of Hall effect sensors. Each comparator compares signals received from the floor surface indicative of magnetic field strength with the threshold signal so as to indicate when a sensor is either directly over the permanent magnet tape or adjacent thereto. Such signals may be interpreted by the controller to indicate the specific location of a vehicle with respect to the desired path of travel defined by the location of the permanent magnet tape.

Accordingly, it is a first object of the present invention to provide an improved magnetically guided vehicle.

It is a further object of the present invention to provide such a vehicle wherein a multiplicity of sensors are disposed perpendicularly to a guide path therefor.

It is a yet further object of the present invention to provide such a vehicle with means for reading a magnetic bar code installed on a floor surface, which bar code gives information to a controller as to the specifics of the guide path defined by the permanent magnet tape.

It is a still further object of the present invention to provide such a device which uses a ramping threshold signal to determine the position of the vehicle over the guide path.

These and other objects, aspects and features of the present invention will be better understood from the following detailed description of the preferred embodiment when read in conjunction with the appended drawing figures.

BRIEF DESCRIPTION OF THE DRAWINGS

FIG. 2 shows a top view of a magnetic sensing array overlying a permanent magnet guide path and a permanent magnet bar code.

FIG. 3 shows a cross-sectional view of a floor having the guide path and/bar code of FIG. 2 thereon.

FIG. 4 shows a graph of threshold volts versus time.

SPECIFIC DESCRIPTION OF THE PREFERRED EMBODIMENT

Figure 1:
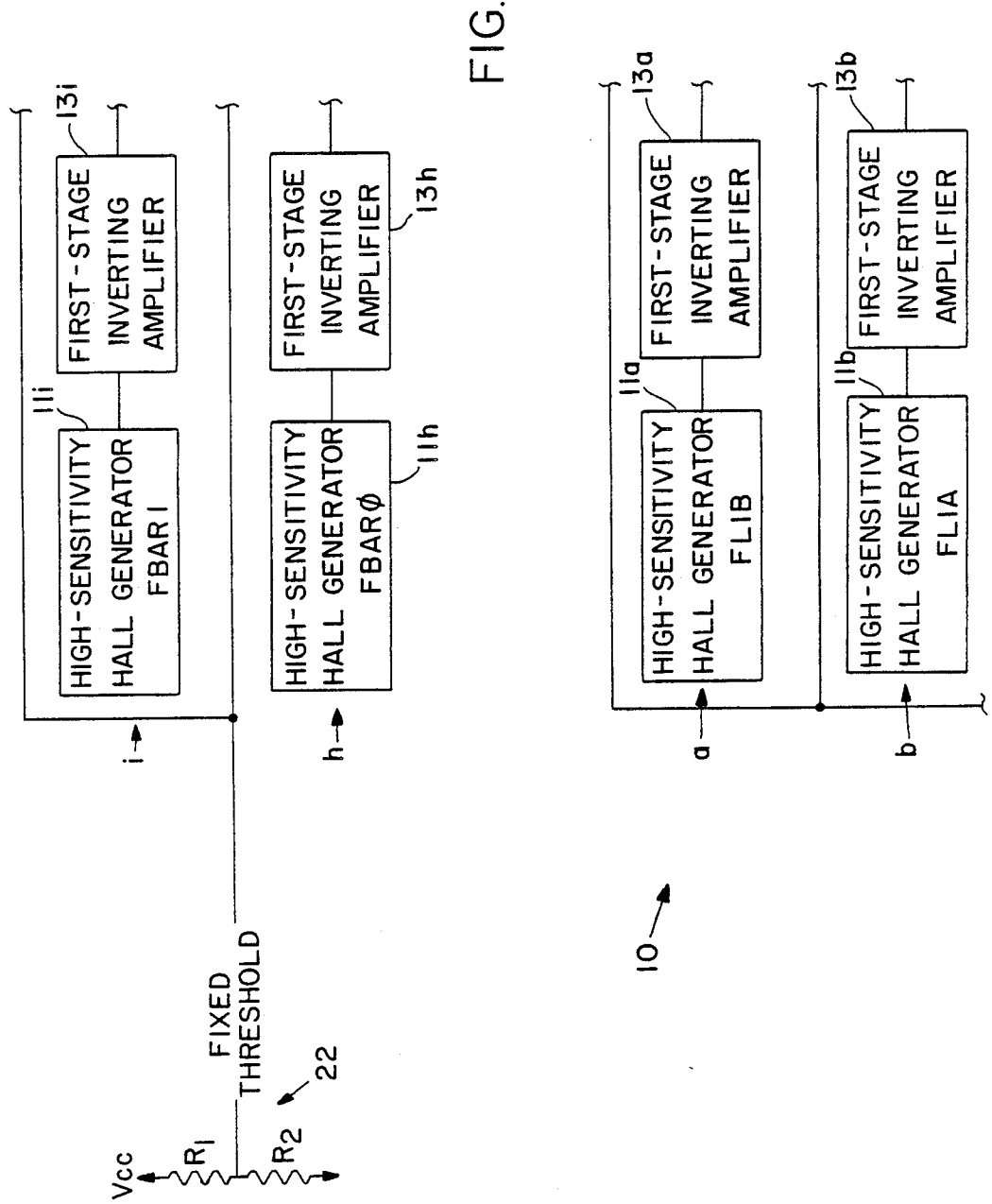
FIGS. 1-1 to 1-4 show a representation of the electrical circuitry of the present invention.

With reference, first, to FIG. 1, the inventive system is generally designated by the reference numeral 10. The system includes a multiplicity of substantially identical sub-systems or sub-circuits as follows: these sub-systems are generally designated by the reference letters a, b, c, d, e, f and g. In FIG. 1, each element of a sub-system will be designated by the reference numeral mentioned herein along with a letter corresponding to one of the general sub-system designating letters a-g noted above.

Each of the sub-systems a-g includes a Hall effect sensor 11, a first stage inverting amplifier 13, a second stage inverting amplifier with offset adjustment 15, a signal magnitude adjustment device 17 and a comparator 19.

With further reference to FIG. 1, a threshold signal 21 is generated by a square wave clock 23, a digital counter with stair-step function generator 25 and a variable gain amplifier with DC offset 27. As should be understood by those skilled in the art, the elements 23, 25, and 27 combine to create the threshold signal. Initially, the threshold jumps to a "high" signal level for a short period of time such as, for example, 1 millisecond, and, thereafter, is ramped down to successively lower voltages. The threshold signal is provided to the comparators 19a-g through the conductors shown in FIG. 1.

As should be understood, each comparator 19 compares, on the one hand, signals received from a Hall effect sensor 11, and on the other hand, the threshold signal 21. In any instance where the buffered signal from the Hall effect sensor 11 exceeds the threshold signal, that information is emitted by a comparator 19.

Figures 1, 2:
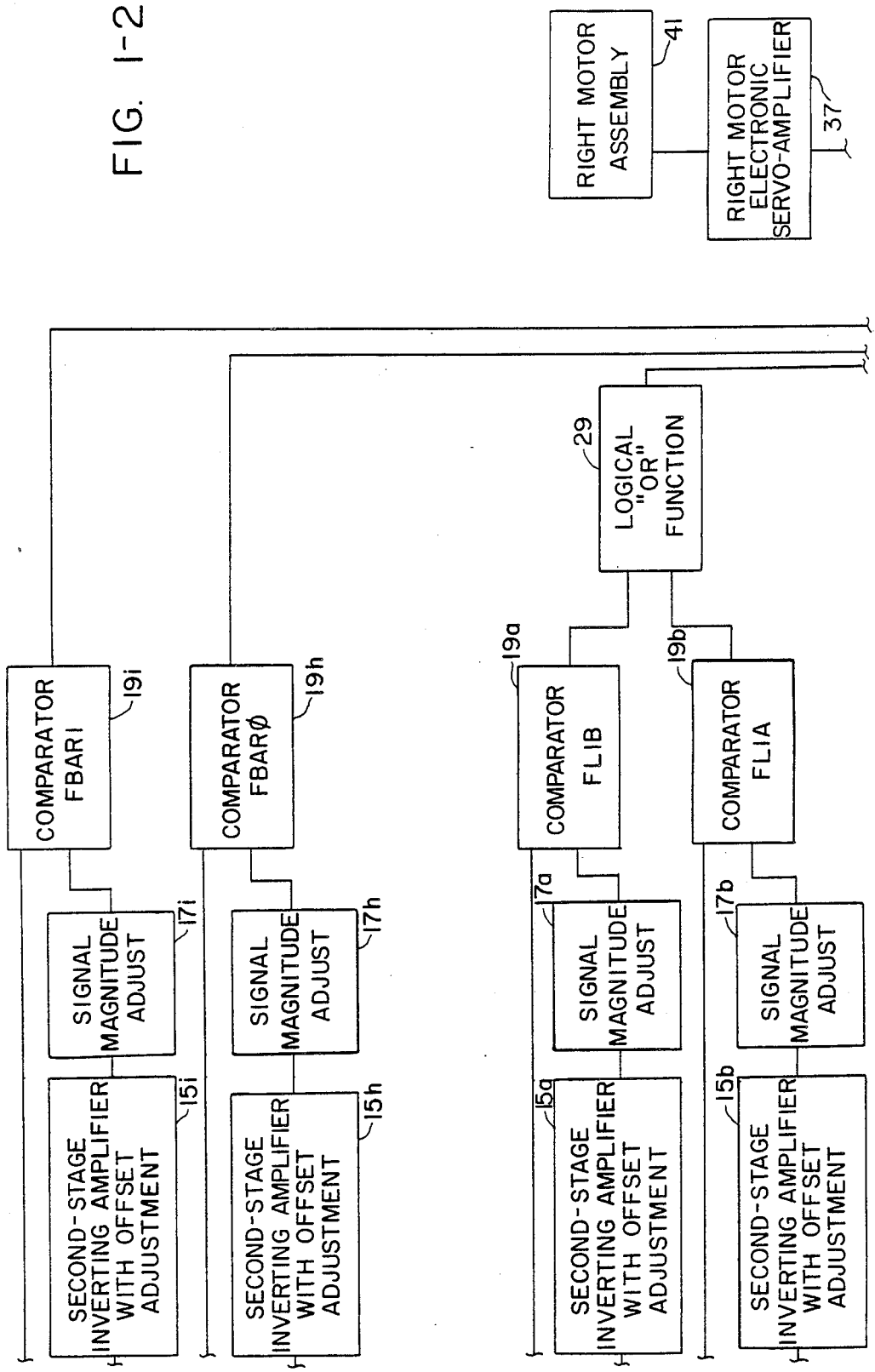

As should be understood with reference to FIG. 2, the Hall effect sensors 11a-11g are aligned in a linear array. One end of the array includes the sensors 11a and 11b, whereas the other end of the array includes the sensors 11f and 11g. With reference back to FIG. 1, the comparators 19a and 19b have their outputs connected to an OR gate 29, whereas the outputs of the comparators 19f and 19g have their outputs connected to an OR gate 31. The OR gates 29 and 31 are designed to only allow the higher signal through. Thus, if the vehicle drifts laterally with respect to the guide path to an extent where the sensors 11a, 11b or 11f, 11g sense the permanent magnet tape, such signals are passed through the OR gates 29 or 31 and thence to the buffer/line driver 33. If the buffer/line driver includes a greater number of input ports than the number shown in FIG. 1, then the OR gates 29 and 31 may be omitted. However, the present invention is sufficiently effective that it is only rarely that the sensors 11a, 11g will be over the permanent magnet tape. Such instances include when the vehicle is travelling around a curve or sharp turn.

As shown in FIG. 1, the outputs from the buffer/line driver 33 are connected to inputs of a microprocessor/digital controller 35. The controller 35 receives signals from the outputs of the comparators 19 and lock gates 29 and interprets data received and correspondingly controls motive means such as servo amplifiers 37, 39 which control operation of the respective motor assemblies 41, 43. As shown in FIG. 1, the servo amplifier 37 controls the right motor assembly 41, whereas the servo amplifier 39 controls the left motor assembly 43. Through control signals from the controller 35, the motor assemblies 41 and 43 may be operated to move the associated motors in either direction and at desired speeds of rotation. Thus, for example, if it is desired to turn the vehicle about an axis thereof in a circular fashion, the motor assemblies 41 and 43 may be ordered to rotate in opposite directions at like speed to allow the vehicle to turn a sharp corner on the permanent magnet tape.

Figures 1, 2, 3:
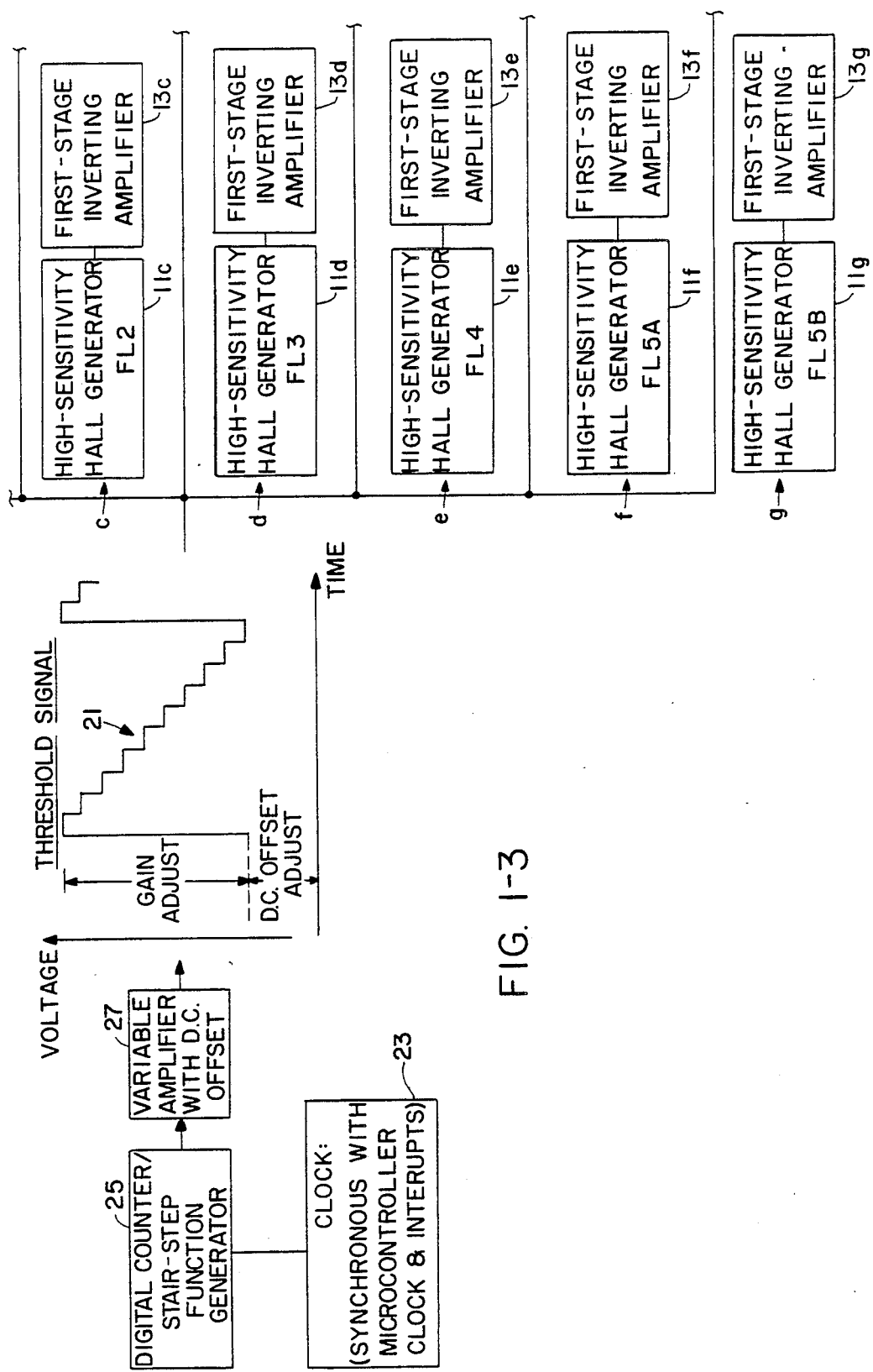

With reference to FIGS. 2 and 3, the permanent magnet guide path tape is designated by the reference numeral 47 and may comprise a tape made of a material such as, for example, vinyl having permanent magnetic material incorporated therewith. If desired, an adhesive backing may be provided on the tape 47 to allow its adherence to the floor surface 48. The sensors 11a-g are shown as they are intended to be oriented with respect to the longitudinal extent of the tape 47. The perpendicular relationship between the sensors 11a-g and the tape 47 is important to note. The present invention intends that this relationship be maintained as closely as possible throughout operation of the present invention.

Also shown in FIGS. 2 and 3 is a permanent magnet bar code 50. In this regard, with reference to FIGS. 1, 2 and 3, two additional sub-systems h and i are also included in the system 10 and comprise a code reader. These sub-systems include the respective Hall effect sensors 11h, 11i. In a corresponding fashion to the sub-systems a-g, each of the sub-systems h and i includes a first stage inverting amplifier 13, a second stage inverting amplifier with offset adjustment 15, a signal magnitude adjustment device 17 and a comparator 19. A fixed threshold signal 22 is fed to each comparator 19h, 19i, and each comparator 19h, 19i compares the signal from the fixed threshold 22 with signals received from the Hall effect sensors 11h, 11i, respectively.

The permanent magnet bar code 50 is provided to give the controller 35 particular information as to the specific guide path which has been created by the tape 47. Thus, for example, the user may program into the memory of the controller 35 information in map-like form of the specifics of the guide path defined by the tape 47.

Thus, for example, information may be inputted into the memory of the controller 35 that the guide path extends in a straight line for 5 feet, makes a 45° left hand turn extending for another 6 feet, makes a right hand turn in a curve of a radius of 20 feet for a distance of 10 feet, etc. Such information inputted into the memory of the controller 35 may be accessed by inputting into the controller 35 the bar code 50. Thus, when the sensors 11h, 11i travel over the bar code 50, signals are transmitted to the controller 35 via the buffer/line driver 33 which identify the specifics of the bar code 50 and allow the controller 35 to access the guide path information contained in the controller memory.

Such information may be used by the controller 35 to verify the actual information received by the controller 35 responsive to movements of a vehicle over the guide path tape 47.

FIG. 3 shows a schematic representation of a device such as a vehicle 1 on which the sensors 11a-i are mounted. The vehicle may take any desired form and its particular construction is not important in the teachings of the present invention.

Figures 1, 2, 3, 4:
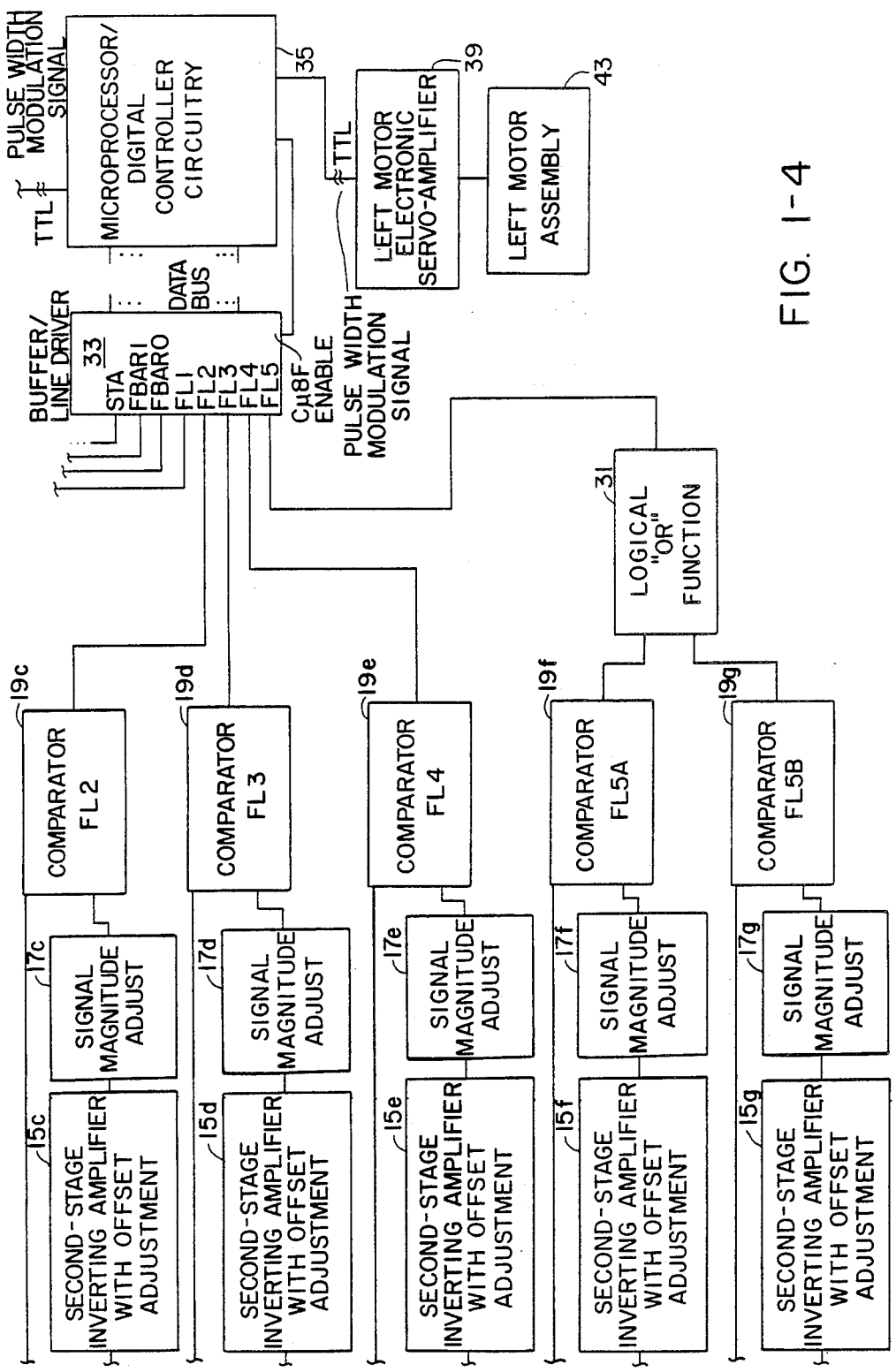
Figure 2:
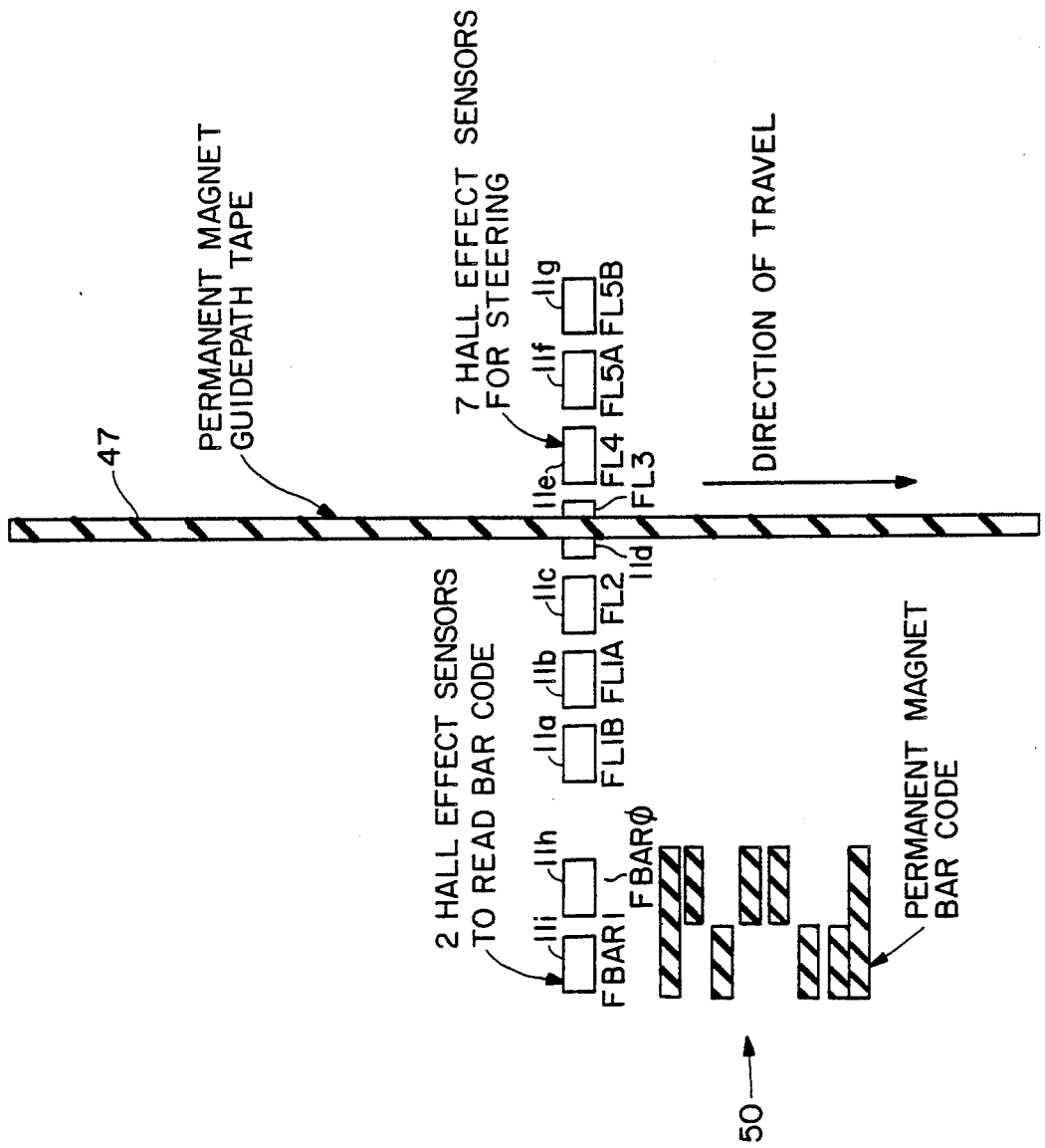
Figure 4:
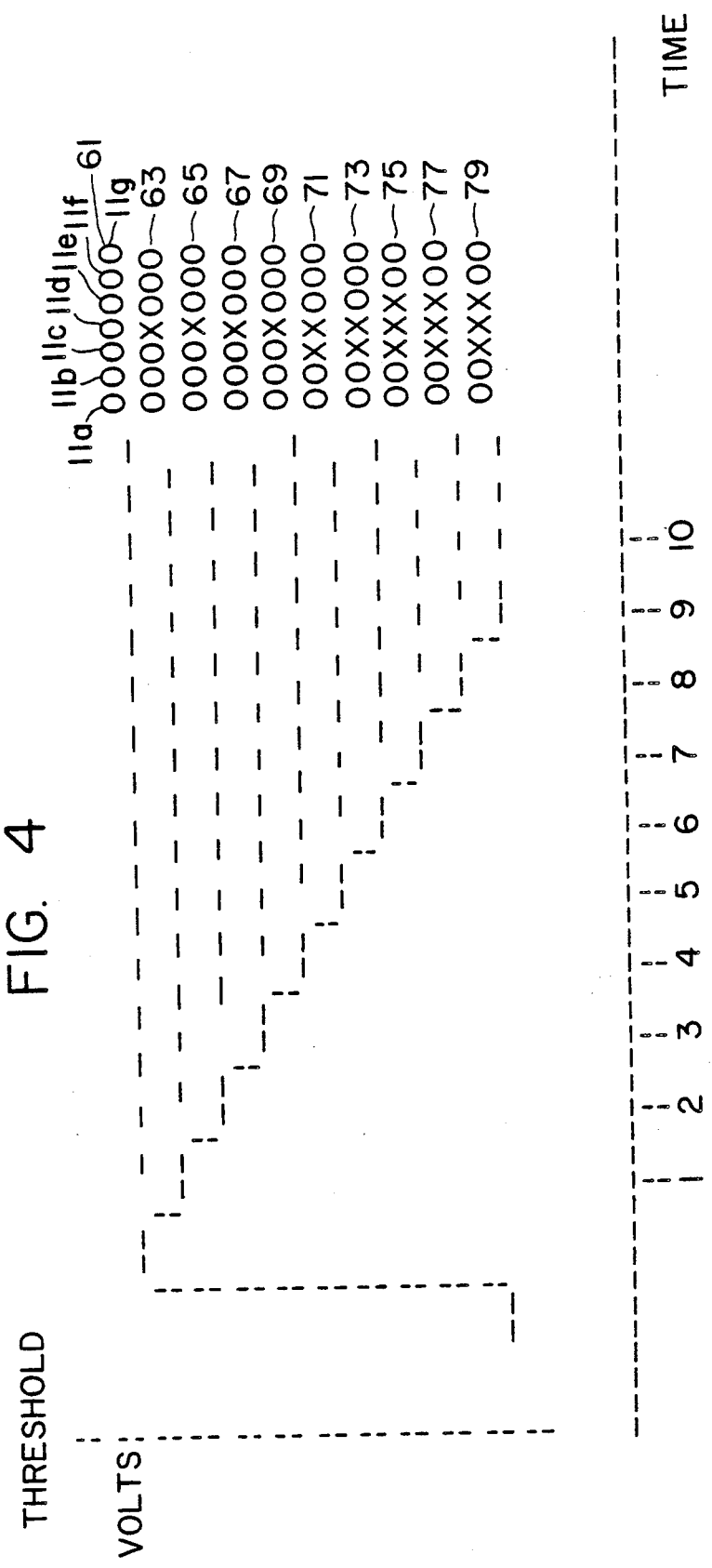

The graph of FIG. 4 is intended to better explain the types of signals which may be received by the controller 35 as the vehicle 1 moves over the guide path 47. In the graph, "O"s are meant to designate that no signal above the threshold signal 21 has been received by a respective Hall effect sensor. "X"s are meant to indicate that a signal above the threshold signal 21 has been sensed by a Hall effect sensor. Thus, in viewing FIG. 4, it should be understood that the location of the permanent magnet tape 47 is generally defined by the location of the "X"s in the figure. In FIG. 4, each lateral row of "O"s and "X"s is meant to depict that which the sensors 11a-g sense at a particular moment in time. These particular rows are designated by the reference numerals 61, 63, 65, 67, 69, 71, 73, 75, 77 and 79. This is the information which is continuously received by the controller 35 as the vehicle 1 moves over the guide path 47. Were the vehicle to drift laterally with respect to the guide path permanent magnet tape 47 to an extent where "X"s would appear on the graph of FIG. 4 corresponding to the sensors 11a, 11b or 11f, 11g, the controller 35 would operate the servo amplifiers 37, 39 to make an adjustment in the movement of the vehicle 1.

In further explanation of various ones of the components described broadly above, the first stage amplifiers 13 provide signal buffering and amplification of the output signals received thereby from the Hall effect sensors 11.

The second stage amplifiers 15 provide signal amplification and offset adjustments to allow compensation for the "high gain" effects of the amplifiers 13. The signal magnitude adjustment devices 17 are provided to allow the making of compensation in signal magnitude so that compensation may be made for differences between the sensors 11 and the high gain amplifiers.

The OR gates 29, 31 are provided to allow additional width for the tracking sensors 11a, 11b and 11f, 11g. The outermost sensors 11a and 11g are provided to allow an additional width of floor surface 48 to be covered by the sensors 11 than would be the case if only five sensors 11b-f were employed. As described above, if a buffer/line driver 33 is provided having sufficient numbers of input ports, the OR gates 29, 31 may be dispensed with. However, inclusion of the OR gates 29, 31 increases the simplicity of the analysis which is required by the controller 35 in operating the system.

In the operation of the inventive system, determination of the exact location of the guide path tape 47 with respect to the array of sensors 11 is accomplished by sweeping the threshold level of the signal 21 from a high voltage level to a low voltage level in a stepped fashion. As this sweeping is taking place, signals received at the input ports of the buffer/line driver are viewed at each level of intensity of the threshold signal 21. Since the threshold signal may be changed every millisecond or more quickly, the particular signals received by the sensors 11 may be monitored many times per second. The signal strength of each sensor 11 is compared to the moving threshold signal 21 at each level of intensity and the controller 35 reviews the outputs of the comparators 19 and, therefrom, forms an array of signals such as that which is depicted in FIG. 4, thus providing an overall picture of the floor surface 48 at various levels of intensity. This allows the vehicle to track on magnetic mediums having varying intensity and allows the digital controller 35 to interpret only valid data signals.

Again, as particularly depicted in FIG. 4, at each moment in time, a sample or picture of the floor surface 48 including the particular location of the permanent magnet guide path tape 47 is taken by the digital controller 35. As the digital controller 35 is programmed, every time the controller has taken 10 time periods of data, which may take as little time as 10 milliseconds, the controller 35 interprets the pattern created by these 10 time periods and calculates an error signal proportional to the position of the tape 47 with respect to the sensors 11. For example, so long as the strongest signal is being received by the sensor 11d, the controller 35 knows that the vehicle is centered directly over the guide path tape 47 in a proper manner. Under such circumstances, no steering or differential compensation signals need be generated by the controller 35, and the vehicle 47 will progress along the guide path permanent magnet tape 47 with only velocity compensations being made. As explained above, should signals be received indicative of the sensors 11a, 11b or 11f, 11g being located over the tape 47, error signals are generated to turn the vehicle 1 in such a manner as to re-center the vehicle over the sensor 11d. In this way, close control of the vehicle may be accomplished and compensation signals may be generated many times per second to cause the vehicle 1 to safely travel over the guide path permanent magnet tape 47 in a predictable and reproducible manner.

As such, an invention has been disclosed in terms of a preferred embodiment thereof which fulfills each and every one of the objects of the invention as set forth hereinabove and provides a new and improved guidance system for a vehicle such as a robotic vehicle of great usefulness and novelty. Of course, various changes, modifications and alterations in the teachings of the present invention may be contemplated by those skilled in the art without departing from the intended spirit and scope thereof. As such, it is intended that the present invention only be limited by the terms of the appended claims.

What is claimed is:
1. An improved guidance system, comprising:
 (a) a tape having permanent magnet material incorporated therein, said tape being attachable to a floor surface, said tape, when attached to said floor surface, defining a desired guide path;
 (b) a device adapted to travel over said floor surface along said guide path, said device having a guidance system, comprising:
  (i) at least three Hall effect sensors arranged in a linear array, said device being oriented with respect to said guide path such that said array is maintained, by operation of said guidance system, substantially perpendicular to said guide path;
  (ii) a controller electrically connected to said sensors and receiving first signals therefrom indicative of the position of said array with respect to said tape, each said sensor being electronically connected to said controller via a corresponding sub-circuit including a comparator which compares said first signals with a variable reference signal, said controller varying said reference signal from a first high voltage downwardly in stepped fashion until said first signals exceed said reference signal whereupon said first signals are transmitted to said controller;
  (iii) motive means on said device for moving said device along said guide path, said controller emitting second signals to control said motive means;
 (c) a code on said floor surface, said guidance system having a code reader adapted to read said code when said device travels thereover, said code reader sending third signals to said controller indicative of said code, said third signals accessing a memory means of said controller wherein information is stored regarding specifics of said guide path, said controller comparing said information with said first signals to verify movements of said device along said guide path.

2. The invention of claim 1, wherein said linear array includes seven Hall effect sensors.

3. The invention of claim 1, wherein said motive means includes a plurality of servo amplifier operated motors.

4. The invention of claim 1, wherein said code comprises a magnetic code.

5. The invention of claim 4, wherein said code reader comprises a magnetic code reader.

6. The invention of claim 4, wherein said code comprises a bar code.

7. The invention of claim 1, wherein said device comprises a vehicle.

8. The invention of claim 1, wherein outputs from at least two of said comparators are inputted into an OR gate.

9. In a magnetically guided vehicle having motive means to move said vehicle over a floor surface following a magnetic pathway of predetermined width, the improvement comprising a guidance system for controlling said motive means to follow said magnetic pathway, said guidance system comprising:
 at least three Hall effect sensors arranged in a linear array, said linear array having a length greater than the width of said magnetic pathway, said linear array arranged on said vehicle so as to be substantially perpendicular to a direction of travel of said vehicle;
 a controller electronically connected to said sensors and receiving first signals therefrom indicative of the position of said array with respect to said magnetic pathway, each said sensor being electronically connected to said controller via a corresponding sub-circuit including a comparator which compares said first signals with a variable reference signal, said controller varying said reference signal from a first voltage downwardly in stepped fashion until said first signals exceed said reference signal whereupon said first signals are transmitted to said controller, said controller emitting second signals to control said motive means.

* * * * *